Figure 1:
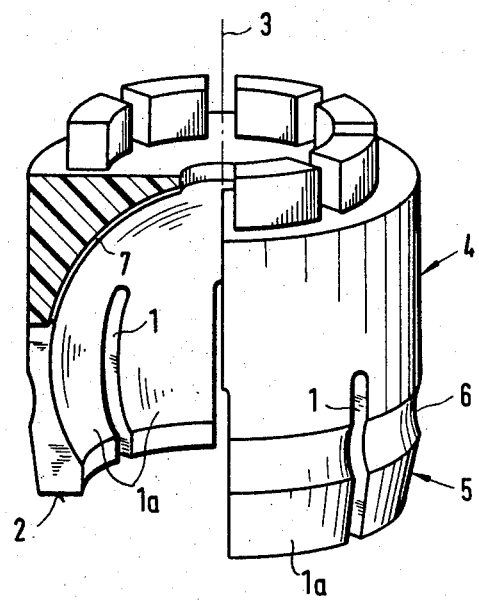

United States Patent [19]
Cutler

[11] 3,787,127
[45] Jan. 22, 1974

[54] BALL JOINT

[75] Inventor: Richard Cutler, Wiesenweg, Germany

[73] Assignee: Gottfried Reuter GmbH, Lemforde, Germany

[22] Filed: Nov. 22, 1971

[21] Appl. No.: 201,081

[30] Foreign Application Priority Data
Nov. 23, 1970 Germany.................. P 20 57 513.7

[52] U.S. Cl.............................. 403/133, 403/140
[51] Int. Cl. ........................................... F16c 11/06
[58] Field of Search.................. 287/87, 90 R, 90 C

[56] References Cited
UNITED STATES PATENTS

| | | | |
|---|---|---|---|
| 3,210,105 | 10/1965 | Vogt | 287/87 |
| 3,554,586 | 1/1971 | Cutler | 287/87 |
| 3,375,028 | 3/1968 | Patton | 287/90 R |
| 3,220,755 | 11/1965 | Gottschald et al. | 287/87 |
| 3,530,495 | 9/1970 | Findel | 287/87 |

FOREIGN PATENTS OR APPLICATIONS
777,002   6/1957   Great Britain .................. 187/90 C

*Primary Examiner*—Andrew V. Kundrat
*Attorney, Agent, or Firm*—Clelle W. Upchurch

[57] ABSTRACT

A ball and socket joint is provided having a casing with a bore closed at one end with a cover, a ball in the casing and a resilient bearing between the ball and the wall of the bore, the bore being cylindrical from the opening closed by the cover to a point below the maximum cross-section of the ball where it merges into a frustoconical portion terminating adjacent the ball pin in an annular inwardly extending flange, the external configuration of the bearing corresponding to that of the wall of the bore, having protuberances adjacent to and compressed by the cover and having circumferentially spaced longitudinal slots in that portion thereof which is frusto-conically shaped to reduce the volume of the bearing and reduce friction when the ball moves with respect to the bearing.

4 Claims, 2 Drawing Figures

BALL JOINT

This invention relates generally to ball joints and more particularly to an improved resilient bearing for such joints.

A ball joint having an improved resilient bearing is described in my U.S. Pat. No. 3,554,586. The ball and bearing are enclosed in a suitable casing having a bore. The bore has a substantially cylindrical portion adjacent the end through which the ball and ball pin are inserted. The cylindrical portion of the bore merges with a frusto-conical or trunconical portion adjacent the lower portion of the ball and just above an inwardly extending flange about the open end adjacent the ball pin or stem A resilient bearing having an external peripheral configuration corresponding to that of the bore and a spherical cavity adapted to fit about the ball is provided with one or more upwardly projecting protuberances on its surface adjacent the cover which closes that end of the casing above the ball. The edge of the casing is peened over the edge of the cover to hold it in place and to press it against the protuberances. The pressure on the protuberances comprises the bearing in the bore so that any wear on the bearing by the ball is compensated for by the bearing being pushed towards the ball because of its compressed state.

The joint disclosed in the aforesaid patent has the advantage of properly supporting the ball and pin in the casing as the bearing wears but it has the disadvantage that the friction between the lower part of the ball and the bearing is relative high because of the compression of bearing material in the frusto-conical portion of the bore.

An object of this invention is to provide a ball joint having an improved bearing. Another object of the invention is to provide a bearing of the above described type adapted to be used between the ball and casing of a ball and socket joint without unreasonably high friction. Still another object of the invention is to improve upon a ball joint of the type described above by reducing the friction between the ball and bearing.

Figure 2:
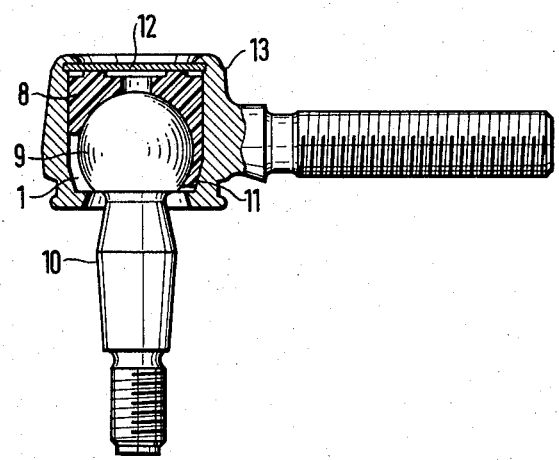

Other objects will become apparent from the following description with reference to the accompanying drawing in which:

FIG. 1 is a cut-away perspective view, partially in section of one embodiment of the bearing provided by the invention; and FIG. 2 is a side elevation, partially in section of a ball and socket joint provided with the bearing of FIG. 1.

The foregoing objects and others are accomplished in accordance with this invention, generally speaking, by providing a bearing of the type described above and in U.S. Pat. No. 3,554,586, the disclosure of which is incorporated herein by reference, having circumferentially spaced slots extending longitudinally from the edge of the bearing nearest the ball pin to a point just above the maximum cross-section of the ball. Portions of the bearing are removed by these slots providing frusto-conical segments therebetween adapted to fit within the corresponding frustoconical portion of the bore about the ball.

More specifically, the invention provides a ball joint having a casing provided with a bore which has a cylindrical portion through which a ball pin and ball may be inserted and a cap or cover for the open end of the bore. That end of the bore spaced from the cover has an inwardly extending annular flange about an aperture through which the ball pin protrudes when the ball is positioned in the casing. A frustoconically shaped portion of the bore has its maximum cross-section or base merging with the cylindrical portion of the bore and its minimum cross-section adjacent the flange. A resilient bearing having an external configuration corresponding substantially to that of the bore but spaced a short distance from the annular flange substantially fills the space between the ball and the wall of the bore. The surface of the bearing which is adjacent the cover has a protuberant ring or a plurality of spaced protuberances projecting therefrom towards the cover. When the joint is assembled the ball with the bearing may be inserted through the mouth of the bore, the cover pressed in the mouth below the surface of the casing and the edge of the casing peened around the edge of the cover to form an annular flange which secures the ball and bearing in the bore of the casing. The protuberances are compressed and serve as a spring which urges the bearing against the ball and prevents space between the ball and bearing from developing as the bearing wears from relative movement. Circumferentially spaced slots extending longitudinally from the edge of the bearing adjacent the frustoconical portion of the casing permit the segments of the bearing therebetween to be pressed substantially together about the ball without development of excessive pressure and friction between the ball and bearing. A groove in the wall of the bearing of less depth than the thickness of the wall may extend from the closed end of the slot around the inner periphery of the remainder of the bearing. This groove may contain grease or similar lubricant which may extend between the walls of the slot. Preferably, the slots are spaced uniformly around the circumference of the bearing and alternate slots communicate with lubricant grooves. The bearing may be further improved by providing a shallow annular groove in its external surface between the cylindrical portion and frusto-conical portion thereof.

The cutouts or slots in the bearing provide an effective and simple means for reducing the volume of bearing to be compressed between the ball and the casing wall about the frusto-conically shaped portion of the bore when the bearing is pressed into place. The tongue-shaped segments between the slots fold accurately around the ball as the walls of the slots are moved towards each other to insure sealing of the ball in the bearing. Undesirable tension on the bearing and excessive friction between the ball and bearing are avoided. This is particularly true if a shallow annular groove is provided between the frusto-conial portion and cylindrical portion of the outer wall of the bearing.

The slotted portion of the bearing facilitates assembly of the ball and casing and the slots may be used alone or with the above described grooves for lubricant. The advantages of the invention are achieved solely by slight modification of the bearing which are inexpensive but greatly improve the functioning of the ball joint.

Although it is preferred that the slots extend to a point just above the maximum diameter of the cavity in the bearing, they may be shorter but best results are obtained if they extend through the frusto-conical portion of the bearing. The bearing may be rubber, polyurethane elastomer or any other suitable resilient material.

Referring now to the drawing, an embodiment of the resilient bearing provided by the invention is illustrated generally as 8. A plurality of circumferentially spaced longitudinally extending slots 1 are cut through the bearing 8 beginning at the lower end 2 thereof and extending upwardly to a point a short distance above the maximum diameter of the cavity for ball 9. In other words, slots 1 extend from that end of the bearing adapted to fit about the lower end of ball 9 and the integral ball pin 10 in the direction of axis 3 to at least the center plane of the ball through which the axis 3 passes perpendicularly or slightly beyond.

A shallow groove 6 around the outer periphery of bearing 8 is provided between cylindrical portion 4 and frusto-conical portion 5. When bearing 8 is pressed into the frusto-conical portion 11 of casing 13 with the insertion of cover 12, the tongue-shaped segments 1a between slots 1 fit snugly about ball 9. The slots 1 permit the compression of segments 1a about the ball 9 without excessive compression of the resilient bearing.

Slots 1 may be used as grease chambers. In a preferred embodiment, each slot 1 merges with a shallow lubricating groove 7 of less cross-section which extends in the direction of the axis 3 over the entire inner surface of the portion of the bearing which is not provided with slots 1. Slots 1, lubricating grooves 7 and groove 6 can be provided easily by mass production molding techniques.

Although the invention has been described in detail for the purpose of illustration it is to be understood that such detail is solely for that purpose and that variations can be made by those skilled in the art without departing from the spirit and scope of the invention except as it may be limited by the claims.

I claim:

1. In a ball joint having a casing with a bore therethrough, a ball and pin, a resilient bearing between the ball and casing, a cover closing one end of the bore and an inwardly extending annular flange about the opposite open end through which the said pin protrudes, said bore having a substantially cylindrical portion extending from the cover to below the maximum cross-section of the ball and a frusto-conically shaped portion merging at its maximum cross-section with the cylindrical portion and terminating adjacent the said flange, said bearing having an external configuration corresponding substantially to that of the bore and a cavity therein adapted to fit snugly about the ball and an annular groove in the external surface thereof adjacent to the juncture of the cylindrical and frusto-conical portions of the casing, said bearing being pressed by the cover towards the ball and having circumferentially spaced slots extending longitudinally therein with intermediate segments adjacent the frusto-conical portion of the bore which seals the space about the ball with a minimum of friction therebetween.

2. A ball joint having a casing with a bore therethrough, a ball and pin, a resilient bearing between the ball and casing, a cover closing one end of the bore, said bearing having an external surface configuration corresponding substantially to and engaging that of the bore and a cavity therein conforming to the configuration of the ball, circumferentially spaced longitudinal slots in the bearing adjacent the opposite end of the bore and intersecting an annular groove in said external surface, which groove is contiguous with the surface of said bore and which provides a channel for lubricant.

3. A ball joint of claim 2 having protuberance on the surface of the bearing adjacent the cover and compressed thereby.

4. A ball joint of claim 2 wherein the said slots are substantially uniformly spaced about the periphery thereof.

* * * * *